W. H. TSCHANTZ.
CORN HUSKING MACHINE.
APPLICATION FILED DEC. 29, 1914.

1,155,173.

Patented Sept. 28, 1915.
6 SHEETS—SHEET 1.

Fig. 1.

Witnesses
J. H. Bishop
Sylvia Coron.

Inventor
William H. Tschantz
By F. W. Bond Attorney

UNITED STATES PATENT OFFICE.

WILLIAM H. TSCHANTZ, OF ORRVILLE, OHIO.

CORN-HUSKING MACHINE.

1,155,173.  Specification of Letters Patent.  Patented Sept. 28, 1915.

Application filed December 29, 1914. Serial No. 879,441.

*To all whom it may concern:*

Be it known that I, WILLIAM H. TSCHANTZ, a citizen of the United States, residing at Orrville, in the county of Wayne and State of Ohio, have invented a new and useful Corn-Husking Machine, of which the following is a specification.

My invention relates to corn husking machines and it has for its objects the provision of such a machine in which a conveyer is provided for carrying the corn stalks to a pair of suitable snap rolls which remove the ears from the stalks and drop the ears upon suitable husking rolls which remove the husks from the ears.

A further object is to provide a conveyer which is adapted to receive the ears as they come from the husking rolls and carry the same to a wagon or other suitable receptacle.

A still further object is to provide a shaker beneath the husking rolls which is adapted to receive any loose kernels which may be accidentally shelled from the ears and adapted to deposit the same upon the conveyer referred to in the last paragraph.

A still further object is to provide means whereby the stalks are carried diagonally to the snap rolls.

A still further object is to provide snap rolls which are open at one extremity to accommodate any length of stalks.

With these and other objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims without departing from the spirit or sacrificing any of the advantages of the invention.

Referring to the accompanying drawings.

Similar numerals of reference indicate corresponding parts throughout the several figures of the drawings.

The present invention comprises a corn husking machine provided with traction wheels and adapted to be propelled by the engine or other source of motive power which operates the husking mechanism. A suitable tongue or coupling rod is adapted to connect the front axle of the husking machine to the rear of a wagon or other vehicle located in front of the husking machine and adapted to guide the same around a field, the traction drive being provided for the purpose of removing the load of the husking machine from the team which is employed to propel the wagon or other vehicle above referred to. The husking machine is adapted to be moved around the field until it is brought into a position adjacent a shock of corn The machine is then stopped and the stalks are removed from the shock and piled upon the lower end of an inclined table provided upon the machine from where the stalks are automatically fed by means of a conveyer to the snap rolls which remove the ears from the stalks and pass the stalks on to a binder, the ears being dropped on the husking rolls where the husks are removed and carried back to the binder, the husked ears being dropped upon a conveyer which carries them forward to the wagon.

The machine is carried upon a frame 1, preferably composed of channel irons, the frame being supported upon front wheels 2 and rear traction wheels 3, the front wheels being preferably carried by steering knuckles 4, which are connected to the front axle 5 in much the same manner as the steering wheels of an automobile and the rear wheels being fixedly mounted upon the rear axle 6. Intermediate the forward and rear extremities of the frame 1 is located a pair of transverse channel irons 8, between which are supported at a point intermediate the side edges of the frame, a suitable standard preferably formed of a pair of angle irons 9. A supporting frame 10, preferably formed of angle irons is located near the forward extremity of the frame. An inclined table 11, preferably composed of sheet metal is located upon one side of the center of the machine, the upper extremity of the table being supported by means of a brace 12 connected at its extremities to the frame 10 and the standard 9. The lower edge 13 of the inclined table 11 is cut off at an angle, the lowest point of said table being at the rear. A board 14 is located along the lower edge 13 of the inclined table and may be attached thereto in any suitable and well known manner, said board being substantially perpendicular to the table 11.

Figure 1:
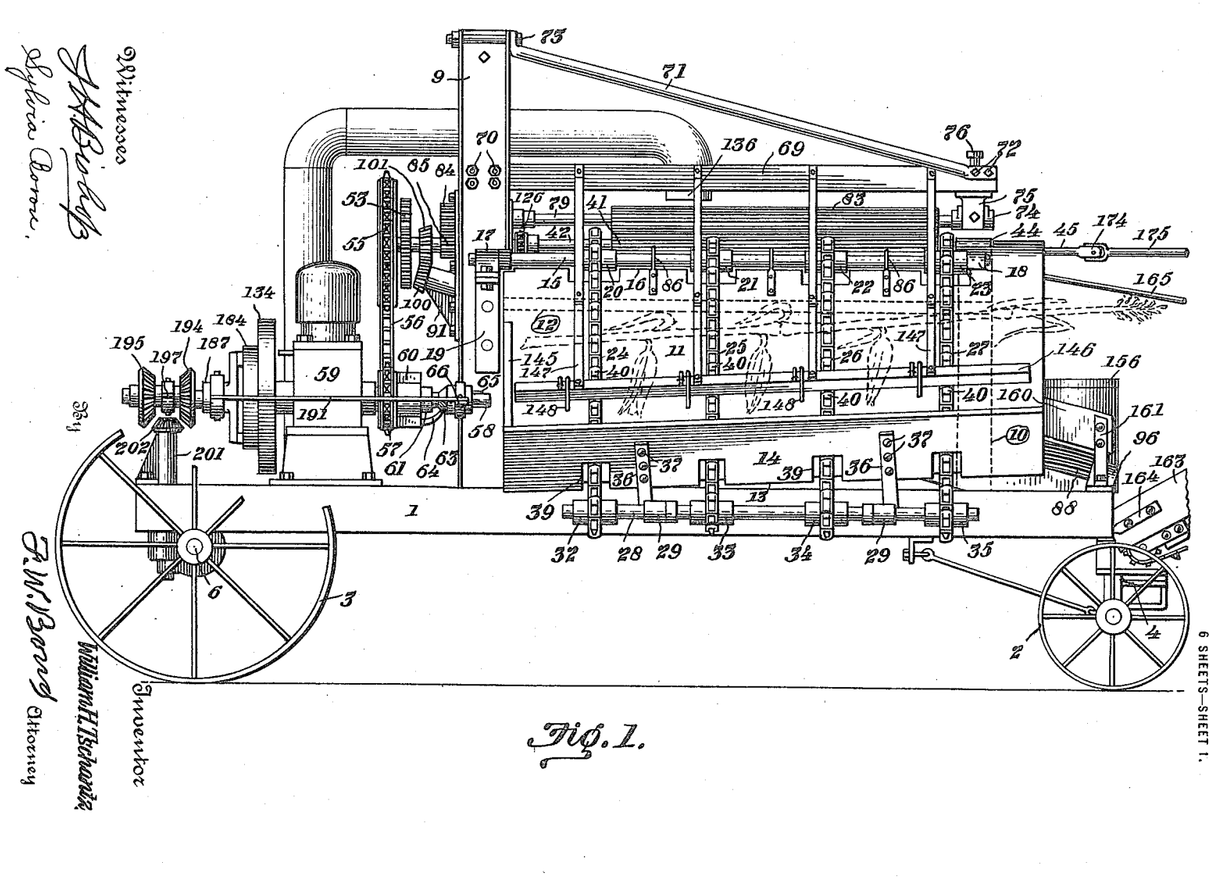
Figure 1 is a side elevation of a corn husking machine constructed in accordance with my invention.
Figure 2:
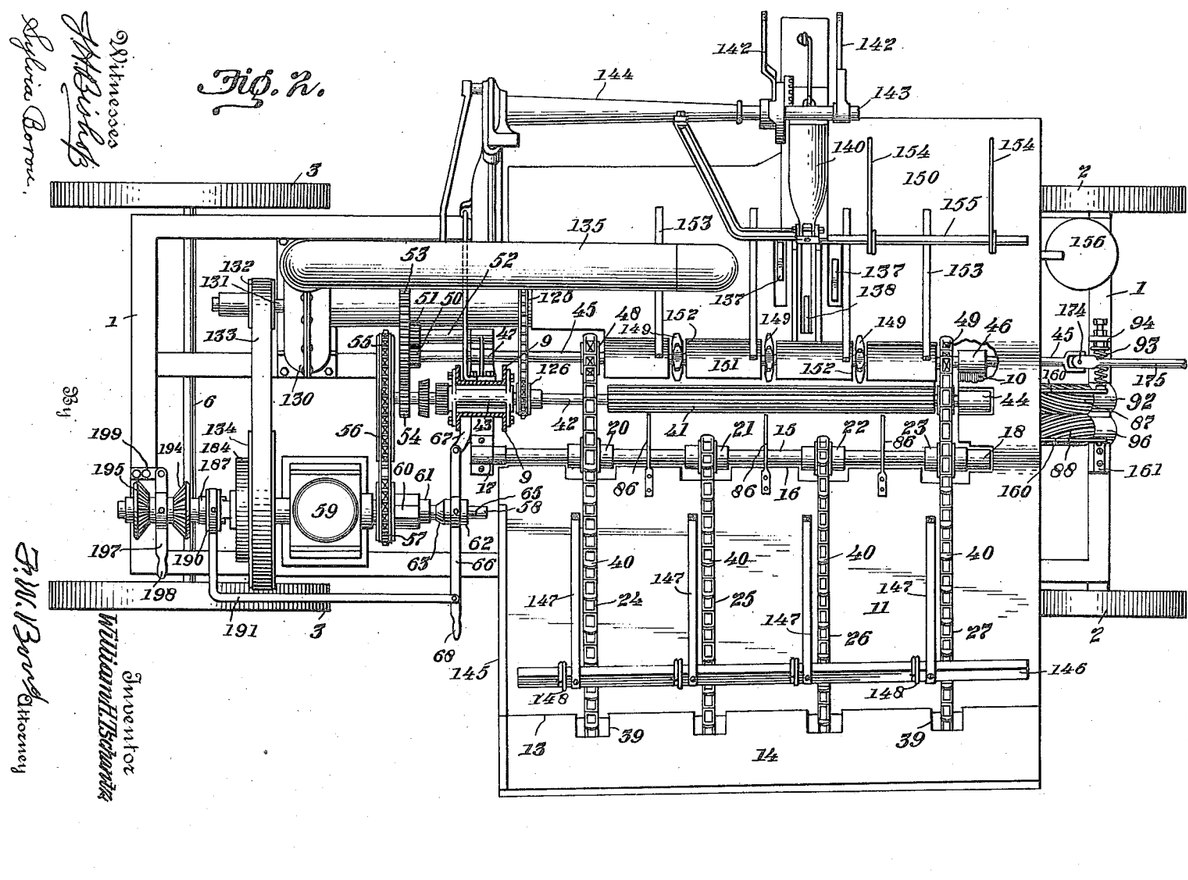
Fig. 2 is a top plan view of the same, parts being broken away for the purpose of illustration.
Figure 3:
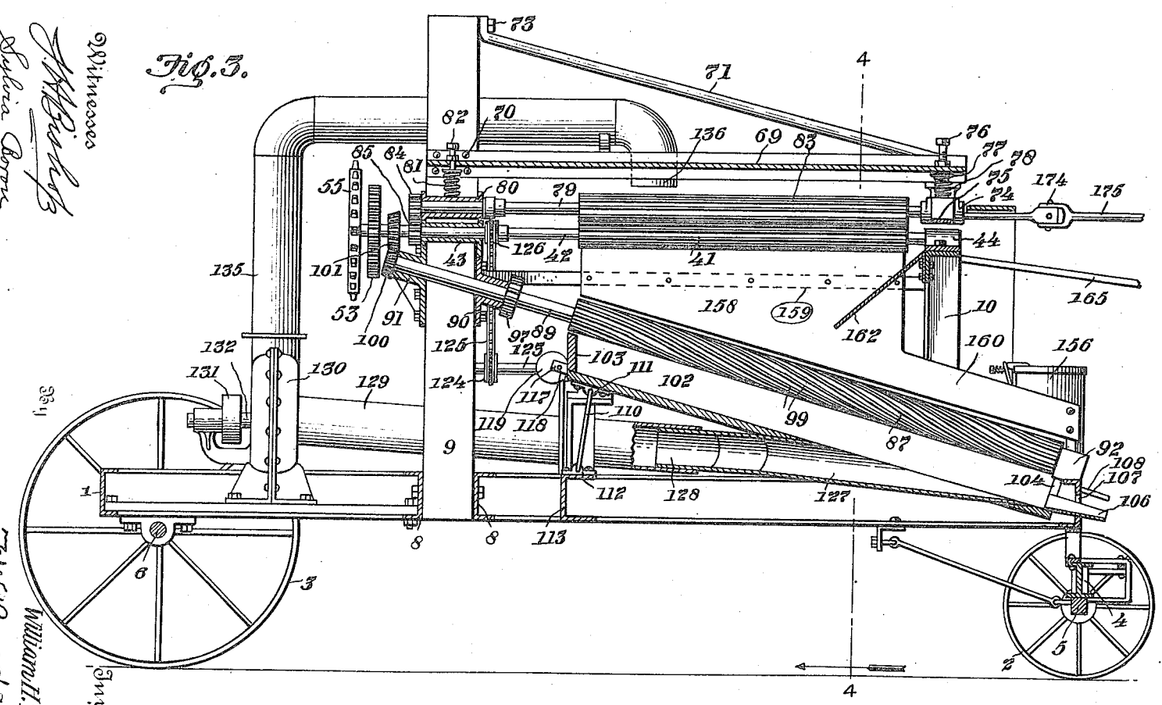
Fig. 3 is a longitudinal vertical section of the same.

A shaft 15 is located adjacent the upper edge 16 of the inclined table 11 and is journaled in suitable bearings 17 and 18, the bearing 17 being supported preferably upon a bracket 19 carried upon the standard 9 and the bearing 18 being preferably supported in any convenient manner upon the frame 10. Sprockets 20, 21, 22 and 23 are spaced at intervals upon the shaft 15 and chains 24, 25, 26 and 27 respectively are located around said sprockets, said chains passing up upon the upper side of the table 11, over the sprockets just described and back beneath the table 11 and over suitable sprockets carried upon a shaft 28. The shaft 28 is journaled in a pair of bearings 29, said bearings being preferably made integral with their supporting brackets 30, said brackets being supported from the frame 1 to which they are connected by bolts 31 or their equivalents. The sprockets 32, 33, 34 and 35 accommodate the chains 24, 25, 26 and 27 respectively. A pair of supporting braces 36 are attached to the board 14 in any convenient and well known manner as by the bolts 37, said supporting braces being connected to the brackets 30 by means of bolts 38. Suitable apertures 39 must be provided in the board 14 to allow for the passage of the chains therethrough. Each of the chains above referred to is provided at intervals with lugs 40 which are adapted to convey the stalks to the snap rolls as will be hereinafter described the lugs 40 being staggered as best shown in Figs. 1 and 2. The chains 25 and 26 after passing up over the sprockets 21 and 22 respectively continue back beneath the table 11 and pass over the sprockets 33 and 34 respectively. The chains 24 and 27 however are continued beyond the sprockets 20 and 23 respectively as will be further described herein. The lower snap roll 41 is fixedly mounted upon the shaft 42, the rear extremity of which shaft is journaled in a bearing 43 carried between the channel irons 9, the forward extremity of said shaft being journaled in a bearing 44 supported upon the frame 10.

A longitudinal shaft 45 is located adjacent the lower snap roll 41 and upon the opposite side from the shaft 15 and is journaled at its forward extremity in a bearing 46 carried upon the frame 10 and near its rear extremity in a bearing 47 which is supported from the standard 9. Sprockets 48 and 49 are fixedly connected to the shaft 45 and adapted to accommodate the chains 24 and 27 respectively, said chains after they pass over the sprockets being carried back to the sprockets 32 and 35 respectively. A pinion 50 is fixedly mounted upon the rear extremity of the shaft 45 and meshes with a pinion 51 carried upon a counter-shaft, said counter-shaft being journaled in an elongated bearing 52, said bearing 52 being preferably formed integral with the bearing 47. A gear 53 is also mounted upon the counter-shaft and meshes with a pinion 54 which is fixed upon the lower snap roll shaft 42. A sprocket wheel 55 is also fixed upon the shaft 42 and a chain 56 connects said sprocket to a sprocket 57 carried upon the shaft 58 of an engine 59, which may be of any suitable and well known construction, an internal combustion engine being shown in the drawings for the purpose of illustration. The sprocket 57 is slidably mounted upon the engine shaft 58 and is provided with an integral loose clutch member 60 which is held against lateral movement upon the shaft in the ordinary manner as by a collar 61. A sliding clutch member 62, provided with a beveled face 63 adapted to engage the finger 64 of the loose clutch member 60 is held against rotation on the shaft by means of a feather key 65 and is adapted to be moved laterally upon the shaft by means of the lever 66 pivoted at its inner end to a bracket 67 supported upon one of the channel irons, the outer extremity of the lever being provided with a handle or grip 68.

An I-beam 69 is supported at its rear end between the channel irons 9 to which it is connected by bolts 70 or their equivalents and its forward end is supported by means of struts 71 which are connected thereto by bolts 72, the struts being connected at their upper extremities to the channel irons 9 by means of bolts 73. A bearing 74 is mounted for vertical movement within a casting 75, said casting being supported by and downwardly depending from the I-beam 69. An adjusting screw 76 located through the I-beam carries a disk 77 upon its lower extremity, and a compression spring 78 is located between said disk and the bearing 74. The upper snap roll shaft 79 is journaled at its forward extremity in the bearing 74, the rear extremity of said shaft being journaled in a sliding bearing 80 mounted between the channel irons 9, a compression spring 81 and adjusting screw 82 being provided for the purpose of normally holding the upper snap roll 83 in juxtaposition to the lower snap roll 41. A pinion 84 upon the rear extremity of the shaft 79 meshes with a pinion 85 upon the shaft 42 thus driving the two snap rolls in unison and in the direction indicated by the arrows in Fig. 4 of the drawings. Each of the snap rolls is provided around its periphery with spaced longitudinal grooves extending throughout the length of the rolls.

A series of fingers 86 are carried by the upper extremity of the table 11 and extend over the shaft 15 to a point adjacent the top of the lower snap roll 41. These fingers are for the purpose of carrying the stalks to the snap rolls, but at the same time the fingers are so spaced that they will allow the ears as they are snapped from the stalk by means of the snap rolls to drop down upon the husking rolls.

Figure 4:
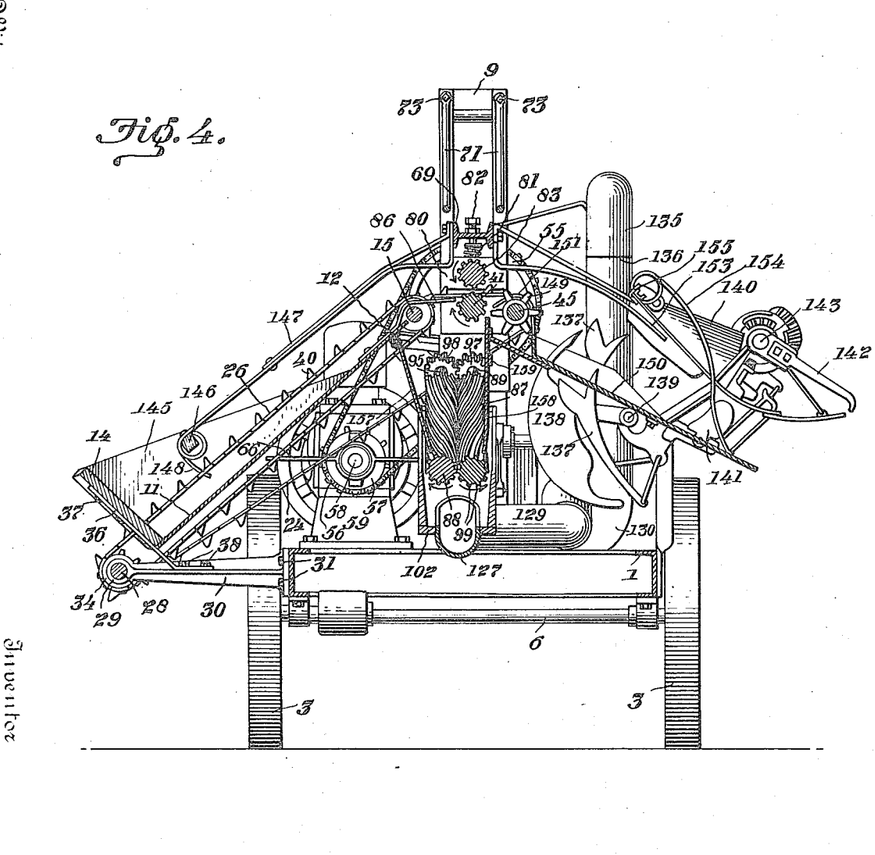
Fig. 4 is a transverse, vertical section taken upon the line 4—4, Fig. 3.
Figure 5:
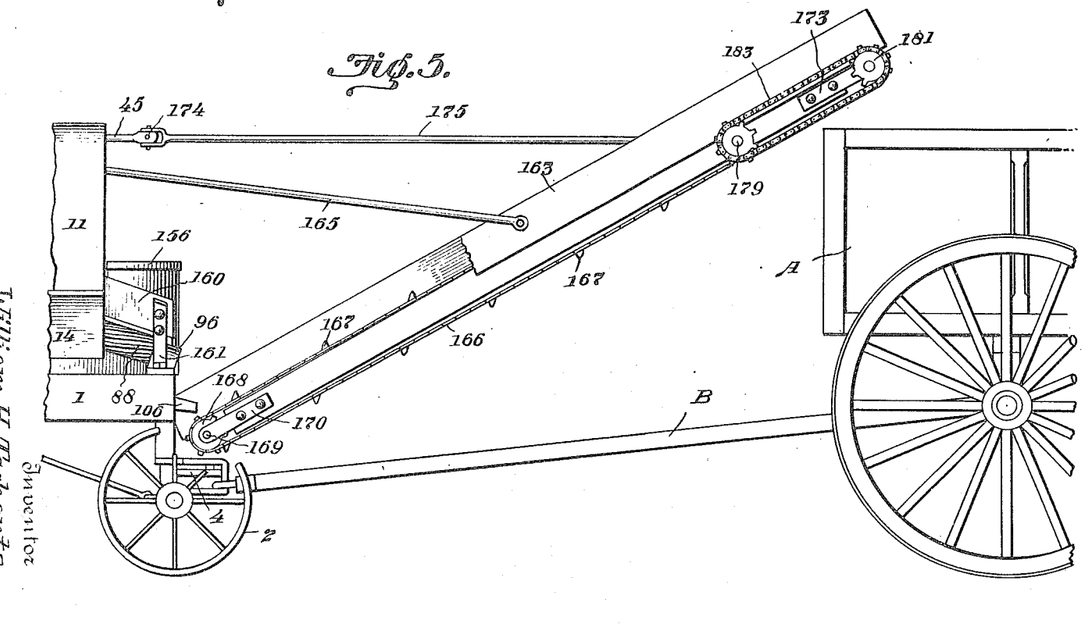
Fig. 5 is a fragmentary view, showing a portion of the forward end of the corn husking machine, showing the conveyer which carries the husked ears away from the husking rolls.
Figure 6:
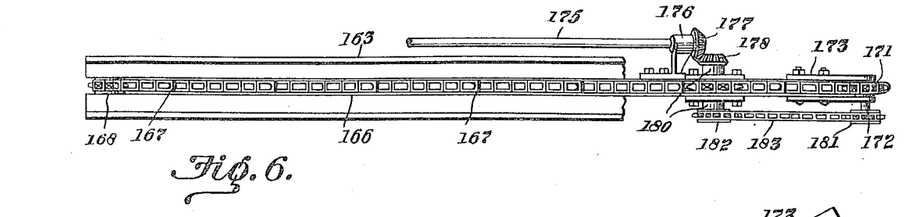
Fig. 6 is a top plan view of the conveyer illustrated in Fig. 5, parts being broken away for the purpose of illustration.
Figures 7, 8:
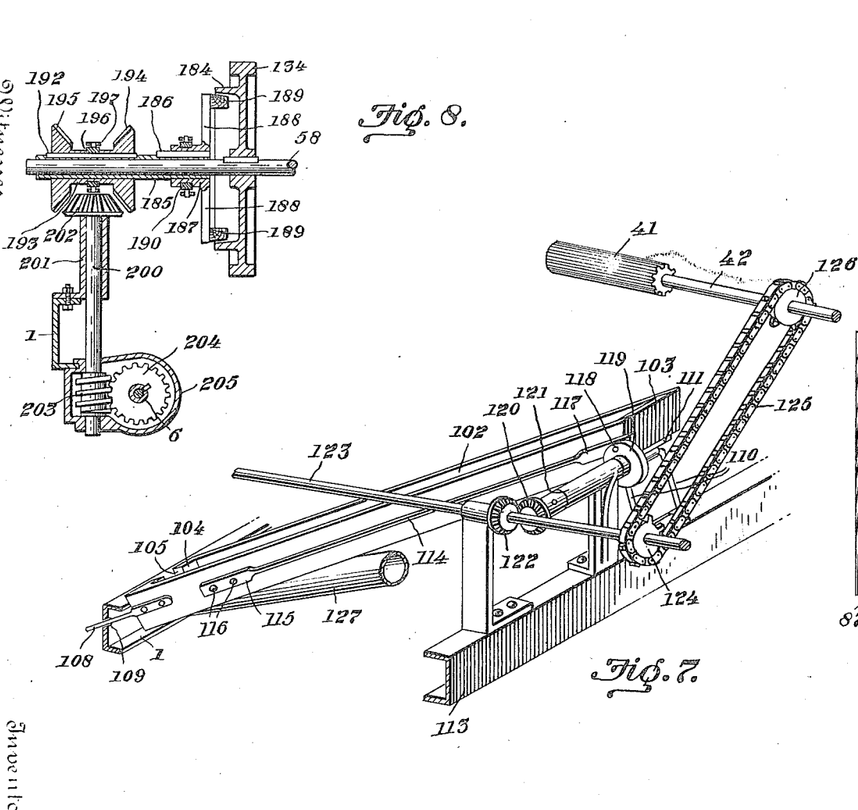
Fig. 7 is a detail perspective view of the mechanism for operating the shaker.
Fig. 8 is a detail sectional view upon a slightly enlarged scale, showing the means for operating the traction drive.
Figure 9:
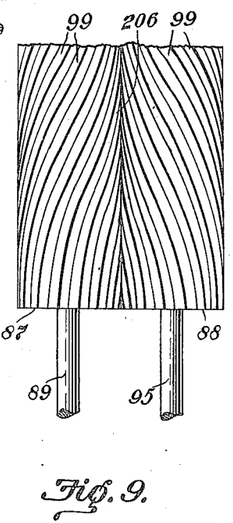
Fig. 9 is a top plan view of the husking rolls.

A pair of husking rolls are arranged beneath the snap rolls, said husking rolls being preferably inclined downward toward the front of the machine and located with relation to the snap rolls as best illustrated in Fig. 4 of the drawings. The husking rolls 87 and 88 are carried between the channel irons 9 and the front of the frame 1. The rear extremity of the shaft 89 upon the roll 87 is fixed in bearings 90 and 91 which are carried by the channel iron standards 9 the forward extremity of this shaft being journaled in a bearing 92, which is slidably mounted upon the front portion of the frame 1, the spring 93 being located between said bearing and the bracket 94 upon the frame, the spring thus tending to normally hold the roll 87 in close contact with the roll 88 but allowing the lower extremity of the roll 87 to be moved away from the roll 88 in the event that a wrench or other tool or foreign object be accidentally dropped upon the husking rolls, thus allowing the object to be passed through between the rolls and thus prevent any damage to the husking rolls. The lower extremity of the shaft 95 which carries the husking roll 88 is journaled in a bearing 96 which is attached upon the forward end of the frame 1 and the rear extremity of said shaft is journaled in the bearing 90. Pinions 97 and 98 are mounted upon the shafts 89 and 95 respectively and mesh with each other, causing the husking rolls to rotate in unison in the direction indicated by the arrows in Fig. 4 of the drawings. Each of the husking rolls is provided with a series of spaced spiral ribs 99 around the periphery thereof, these ribs being so located that as the rolls rotate the ribs upon one roll will register with the ribs upon the other roll. A beveled pinion 100 mounted upon the rear extremity of the shaft 89 meshes with a beveled pinion 101 upon the lower snap roll shaft 42 for the purpose of rotating the husking rolls.

Beneath the husking rolls is located a shaker consisting of a trough 102 which is located parallel to the husking rolls and is of substantially the same length as the husking rolls and of a width substantially equal to the diameter of the two rolls. The rear or upper end of the trough is closed by a wall 103 and the forward wall 104 thereof is provided with a centrally located opening 105 within which is placed a spout 106, said spout being located through a suitable aperture 107 in the front portion of the frame 1. The forward end of the shaker trough is supported by means of a pair of rods 108 which are attached to the shaker trough and slidably mounted within apertures 109 in the front portion of the frame 1. The upper extremity of the shaker trough is supported by means of a pair of rock arms 110 which are journaled at their upper extremities in a bearing 111 carried by the shaker trough, the lower extremities of said rock arms being journaled in a bearing 112 carried upon a transverse channel iron 113 carried by the frame. For the purpose of reciprocating the shaker trough 102 the following mechanism is provided: A pitman rod 114 preferably formed of wood and reduced throughout the greater part of its length intermediate the ends is connected at its lower end 115, to the shaker trough 102 by means of bolts or their equivalents 116, the upper extremity 117 of the pitman rod being engaged by a wrist pin 118 carried upon the pitman wheel 119. The pitman wheel 119 is carried upon a short shaft upon which is also mounted a beveled pinion 120, said shaft being journaled in a suitable bearing 121 which is supported upon the channel iron 113. The beveled pinion 120 meshes with the beveled pinion 122 upon the packer shaft 123 of the binder, said packer shaft being provided with a sprocket 124 over which passes a chain 125, said chain also passing over the sprocket 126 upon the lower snap roll shaft 42. By this construction the shaker trough 102 will be continuously reciprocated beneath the husking rolls during the time that the machine is in operation.

The shaker trough it will be understood is to receive not only the husks which are removed from the ears by the husking rolls, but also any kernels of corn which are accidently shelled during the operation of snapping and husking. The shelled corn will thus be shaken down by means of the reciprocatory movement of the shaker and passed through the spout 106, from which it will be received and removed as will be hereinafter described. The husks, however, must not be allowed to pass out with the shelled corn but must be separated therefrom and for this purpose the following mechanism is provided. A pipe 127 is connected near the lower extremity of the trough 102, said pipe being inclined upward toward the rear of said trough, the rear extremity 128 of said pipe being slidably arranged within a slightly larger pipe 129, said pipe 129 leading to an ordinary fan blower 130, which is located near the rear of the frame 1. A pulley 131 mounted upon the shaft 132 of the blower is adapted to be driven by means of a belt 133, which passes over the drive pulley 134 of the engine 59. A pipe 135 passes up from the blower 130 and is extended forwardly, the downwardly depending extremity 136 thereof being located above an inclined table which is inclined downwardly from the snap rolls and upon which is arranged a binder. This binder is of the usual construction and no claim is made as to the specific construction thereof, it only being necessary that a binder be provided in substantially the location shown in the drawings in order to receive the stalks from the snap rolls after the ears have been removed therefrom and bind the same into bundles.

The binder shown is provided with the usual packers 137 operated in the usual manner by the packet shaft 123, the needle 138 carried upon the compressor shaft 139, the knotter 140, the trip hook 141 and discharge arms 142 mounted upon the discharge shaft 143 which is carried in the binder frame 144. The several other parts necessary to the binder are also of the ordinary construction and the binder is driven from the engine 59 as has been herein described. No further description of the binder is considered necessary as no claim is made to the specific construction of the binder itself and as all of the parts of the binder are constructed and operated in the usual manner.

A wall 145 preferably of a triangular shape as best shown in Fig. 4 of the drawings is located at the rear end of the inclined table 11 and the butts of the stalks are adapted to be placed in proximity to this wall when the stalks are piled upon the conveyer chains in order to prevent any of the stalks from extending too far to the rear of the machine when the stalks are carried through the snap rolls. For the purpose of preventing the stalks from being carried up too swiftly to the snap rolls by the conveyer chains, a bar 146 is supported above the conveyer chains and parallel to the board 14 by means of a series of arms 147 connected at their upper extremities to the I-beam 69. Carried at intervals upon the bar 146 are downwardly depending spring arms 148 which are adapted to prevent the stalks from being carried too swiftly to the snap rolls.

A series of conveyer wheels 149 are provided at intervals upon the shaft 45. The binder table 150 upon which the binder is arranged is provided with an upwardly extended portion 151 having slots 152 therein adapted to receive the conveyer wheels 149, the upwardly extended portion of said table being bent over the shaft 45 and toward the snap rolls. For the purpose of guiding the stalks from the snap rolls to the binder, a series of downwardly curved fingers 153 are attached at their upper extremities to the I-beam 69 and are curved downwardly toward the binder table. In order to support the stalks upon the binder table until the tripper is actuated, causing the bundle to be compressed and tied, a pair of spring arms 154 are carried by a suitable supporting bar 155, preferably supported from the binder frame in any suitable and well known manner, the arms 154 extending downwardly to the binder table and being adapted to receive the weight of the stalks until the bundle is tied and discharged from the table at which time the spring arms, owing to their form and spring action, will be raised at their lower ends by means of the bundle passing thereunder, thus in no way interfering with the discharging of the bundle from the binder. A twine can 156 of the ordinary construction is mounted in any suitable position upon the frame 1 and adapted to contain twine to be used in the knotter of the binder.

For the purpose of guiding the ears which have been snapped from the stalks by means of the snap rolls to the husking rolls a pair of walls 157 and 158 are supported in a substantially vertical position between the snap rolls and husking rolls. The wall 157 is connected at its upper edge to the brace 12 and is slightly inclined toward the husking roll 88 and the wall 158 is supported near its upper extremity by a brace 159 carried between one of the channel irons 9 and the frame 10. Each of the walls 157 and 158 is provided with a reduced forwardly extending portion 160 adapted to maintain the ears upon the husking rolls throughout the entire length of the rolls, said forwardly extended portions being supported by means of brackets 161 attached to the frame. For the purpose of throwing the ears which are snapped at the forward extremity of the snap rolls upon the higher portion of the husking rolls, an inclined chute 162 is provided, said chute being attached to the frame 10.

The conveyer is adapted to carry the husked ears and shelled corn from the husking rolls and shaker respectively to the wagon and consists of a trough 163 open at its upper and lower extremities and supported from the forward extremity of the frame 1 by means of brackets 164 connected to the lower extremity of said trough, and struts 165 connected intermediate the ends of the trough and supported from the frame 10. A conveyer chain 166 provided with lugs 167 is located over a sprocket 168 which is carried by a short shaft 169 journaled in brackets 170 at the lower extremity of the trough and in a position beneath the spout 106, said chain also passing over a sprocket 171 carried upon a shaft 172 journaled in brackets 173 at the upper extremity of the trough 163. For the purpose of driving the conveyer chain 166 the shaft 45 is provided at its forward extremity with a universal joint 174 by means of which a shaft 175 is coupled thereto, the shaft 175 being journaled at its forward extremity in a bearing 176 supported upon the trough 163 and having a beveled pinion 177 mounted thereon, said pinion meshing with a beveled pinion 178 upon a shaft 179 mounted in bearings 180 carried by the trough. The shafts 172 and 179 are provided with sprockets 181 and 182 respectively, said sprockets being connected by means of a chain 183. The upper extremity of the trough 163 is located above the box of a wagon designated by the letter A, the rear axle of said wagon being connected to the forward axle of a husking machine by means of a coupling rod B. By thus coupling the wagon and husking machine together the conveyer trough will always be so located as to discharge into the wagon when the two vehicles are in longitudinal alinement with each other and when the vehicles are both in motion, the husking machine will be guided by the wagon.

For the purpose of propelling the husking machine when desired by means of its own power the fly wheel 134 of the engine is provided with an integral rearwardly extending rim 184 having a slightly tapered inner face, said rim forming a fixed clutch member. A sleeve 185 is loosely mounted upon the engine shaft 58 and slidably mounted upon the sleeve 185, being fixed against rotation thereon by means of a feather key 186, is a sliding clutch member 187 provided with arms 188 upon the outer extremities of which are attached friction blocks 189 adapted to engage with the inner inclined face of the rim 184. A loose ring 190 is mounted in suitable peripheral grooves in the clutch member 187 in the usual manner and a link 191 connects the ring to the lever 66 so that with one operation of the lever 66 the clutch member 187 controlling the traction mechanism may be disengaged from the rim 184 and the clutch 60 controlling the husking mechanism may be engaged with the shaft 58 or vice versa. Slidably mounted upon the sleeve 185 but fixed thereon by means of a key 192 is a sleeve 193 to which are rigidly connected the forward and reverse, beveled driving pinions 194 and 195 respectively. A loose ring 196 is carried in a suitable groove upon the sleeve 193 and a lever 197 is connected to said ring in the usual manner, a handle 198 being formed upon the outer extremity of said lever, the inner extremity being pivoted to a bracket 199. A vertical shaft 200 is mounted in a bearing 201 supported upon the rear portion of the frame 1 and a beveled pinion 202 is carried upon the upper extremity of said shaft and adapted to be engaged by either the forward or reverse beveled pinions 194 and 195 respectively, the lower extremity of said shaft being provided with a worm 203, which engages with a worm wheel 204 mounted upon the rear axle 6 of the husking machine. A housing 205 is provided around the worm and worm wheel and it will be understood that it would be desirable to mount suitable transmission gears within the housing 205 for propelling the husking machine at the proper speed.

The operation of the machine is as follows: The stalks are removed from a shock and piled upon the lower portion of the inclined table 11 between the bar 146 and the board 14, the end wall 145 preventing the butts of the stalks from extending out beyond the rear of the table. It will be understood that the clutch 60 must at this time be in engagement with the engine shaft 58 so that by means of the sprockets 55 and 57 and chain 56, the several members of the machine will be in continuous operation. The lugs 40 upon the chains 24, 25, 26 and 27 will engage the stalks singly and carry them to the snap rolls. As the stalks are piled upon the table 11 they must have their heads inclined slightly toward the snap rolls, owing to the fact that the board 14 is located at an angle to the snap rolls. It will be noted that the lugs 40 upon each of the chains 24, 25, 26 and 27 are so located that as each stalk is carried to the snap rolls by means of the conveyer chains the head of the stalk will be carried ahead of the butt. An examination of the stalk of corn shown in dotted lines shown in Fig. 1 of the drawings will explain the reason for thus carrying the stalks diagonally to the snap rolls. It is, of course, understood that as corn matures and ripens the weight of the ears will cause the stem of each ear to bend downwardly, leaving the ripened ears of corn in substantially the same position with relation to the stalk as is indicated by dotted lines in Fig. 1. Thus it will be seen that if the stalks were fed parallel to the snap rolls, the ears would not be carried in to the rolls at right angles thereto and therefore a great deal of corn would be shelled from the side of the ear coming in contact with the snap rolls. By my construction however the ears are cleanly snapped from the stalks by means of the snap rolls, a great portion of the husks being at the same time removed from the ears. The stalks after passing through the snap rolls are carried on to the conveyer wheels 149 by means of the chains 24 and 27 and deposited upon the binder table. The ears as they are snapped from the stalks are dropped down upon the husking rolls and as the husking rolls are continuously rotated toward each other the ears are carried longitudinally along said rolls, the spiral ribs 99 upon the husking rolls removing every particle of husk and silk from the ears. As the husking rolls rotate each of the spiral ribs upon one roll will register with the adjacent spiral rib upon the other roll thus forming a series of substantially V-shaped pockets 206 between the ribs through which any loose kernels of corn which are accidentally shelled will pass to the shaker. It will be understood, however, that owing to the construction of the husking rolls the kernels will not be accidentally shelled from the ears as is often the case with the ordinary form of husking rolls, there being nothing upon the rolls to gouge the kernels from the ears but at the same time, owing to the peculiar construction of the rolls and the fact that the ear is being continuously rotated as it is carried longitudinally along the rolls every particle of husk will be removed from the ear.

The husks which are removed by the husking rolls and any loose kernels of corn which have been accidentally shelled will pass through the husking rolls and upon the shaker. As the shaker is continuously reciprocating the loose kernels of corn will be shaken down through the spout 106 and upon the conveyer located at the front of the machine, the husked ears also being projected from the husking rolls upon said conveyer the ears and loose kernels being conveyed thereby, away from the husking machine to the wagon. The husks are drawn back out of the shaker through the pipes 127 and 129 and through the blower and pipe 135 and are deposited upon the binder table. As a sufficient amount of stalks and husks are carried to the binder the binder will automatically trip in the usual manner and will bind the stalks and husks in a bundle and discharge them from the machine.

Although the drawings and above specification disclose the best mode in which I have contemplated embodying my invention I desire to be not limited to the details of such disclosure, for, in the further practical application of my invention, many changes in form and construction may be made, as circumstances require or experience suggests, without departing from the spirit of the invention, within the scope of the appended claims.

I claim:

1. A machine of the character described, comprising a frame, horizontal snap rolls mounted upon said frame, a conveyer adapted to carry stalks to said snap rolls, spring fingers located above said conveyer and arranged to prevent the stalks from being carried too swiftly to the snap rolls, husking rolls mounted beneath said snap rolls, a table located upon said frame and arranged to receive the stalks after they pass through the snap rolls, a trough located beneath the husking rolls and adapted to receive the husks from the husking rolls, a blower pipe communicating with said trough, the extremity of said pipe being located above said table, and a blower located intermediate the ends of said blower pipe and adapted to deposit the loose husks from the husking rolls upon said table.

2. In a machine of the character described, snap rolls, a bin located diagonally to said snap rolls and arranged to receive stalks, and a conveyer arranged to carry the stalks from said bin diagonally to said snap rolls.

3. In a machine of the character described, snap rolls, a bin located diagonally to said snap rolls and arranged to receive stalks, a conveyer arranged to carry the stalks from said bin diagonally to said snap rolls, and fingers arranged above said conveyer for the purpose of retarding the movement of the stalks.

4. A machine of the character described, comprising a frame, an inclined table mounted upon the frame, a bin located at the lower extremity of the table and adapted to receive stalks, said bin being located diagonally to the upper edge of said table, snap rolls journaled in the frame and parallel to the upper edge of the table, means for carrying the stalks diagonally from the bin to the snap rolls, means for preventing the stalks from being carried too swiftly to the snap rolls and husking rolls located beneath the snap rolls and in alinement therewith.

5. A machine of the character described, comprising a frame, an inclined table mounted upon the frame, a bin located at the lower extremity of the table and adapted to receive stalks, said bin being located diagonally to the upper edge of said table, snap rolls journaled in the frame and parallel to the upper edge of the table, means for carrying the stalks diagonally from the bin to the snap rolls, means for preventing the stalks from being carried too swiftly to the snap rolls, and husking rolls located beneath the snap rolls and in alinement therewith.

6. A machine of the character described comprising a frame, snap rolls mounted in said frame, a bin mounted in said frame and arranged to receive stalks, said bin being located diagonally to said snap rolls, a conveyer arranged to carry the stalks from said bin to the snap rolls and lugs arranged diagonally upon said conveyer for the purpose of carrying the stalks diagonally to the snap rolls.

7. A machine of the character described, comprising a frame, a pair of snap rolls journaled in said frame, a bin located diagonally to said snap rolls and arranged to receive stalks, a conveyer arranged to carry the stalks from said bin diagonally to said snap rolls, a bar located above said conveyer and parallel to said bin and downwardly disposed fingers carried by said bar for the purpose of retarding the movement of the stalks to the snap rolls.

8. A machine of the character described, comprising a frame, snap rolls journaled in said frame, a bin located diagonally to said snap rolls, spaced conveyer chains arranged to carry the stalks from said bin to said snap rolls, staggered lugs upon said chains for the purpose of carrying the stalks diagonally to said snap rolls, a bar located above said conveyer chains and parallel with said bin and spring fingers carried by said bar and depending downwardly between said chains for the purpose of retarding the movement of the stalks to the snap rolls.

In testimony that I claim the above I have hereunto subscribed my name in the presence of two witnesses.

WILLIAM H. TSCHANTZ.

Witnesses:
  J. H. BISHOP,
  F. W. BOND.